United States Patent
Hariton

(10) Patent No.: US 12,106,411 B2
(45) Date of Patent: Oct. 1, 2024

(54) SYSTEMS AND METHODS FOR UTILIZING A DEVICE AS A MARKER FOR AUGMENTED REALITY CONTENT

(71) Applicant: Nicholas T. Hariton, Trabuco Canyon, CA (US)

(72) Inventor: Nicholas T. Hariton, Trabuco Canyon, CA (US)

( * ) Notice: Subject to any disclaimer, the term of this patent is extended or adjusted under 35 U.S.C. 154(b) by 0 days.

(21) Appl. No.: 18/455,125

(22) Filed: Aug. 24, 2023

(65) Prior Publication Data

US 2023/0394731 A1    Dec. 7, 2023

Related U.S. Application Data

(63) Continuation of application No. 17/103,429, filed on Nov. 24, 2020, now Pat. No. 11,823,312, which is a continuation of application No. 16/837,357, filed on Apr. 1, 2020, now Pat. No. 10,867,424, which is a continuation of application No. 16/741,164, filed on Jan. 13, 2020, now Pat. No. 10,672,170, which is a continuation of application No. 16/158,180, filed on Oct. 11, 2018, now Pat. No. 10,565,767, which is a continuation of application No. 15/707,854, filed on Sep. 18, 2017, now Pat. No. 10,102,659.

(51) Int. Cl.
| | |
|---|---|
| G06T 11/60 | (2006.01) |
| G06F 3/01 | (2006.01) |
| G06F 3/0346 | (2013.01) |
| G06F 3/0482 | (2013.01) |
| G06T 11/00 | (2006.01) |

(52) U.S. Cl.
CPC ............. *G06T 11/60* (2013.01); *G06F 3/011* (2013.01); *G06F 3/0346* (2013.01); *G06F 3/0482* (2013.01); *G06T 11/00* (2013.01)

(58) Field of Classification Search
CPC ....... G06T 11/60; G06F 3/0346; G06F 3/0482
See application file for complete search history.

(56) References Cited

U.S. PATENT DOCUMENTS

| | | |
|---|---|---|
| 11,120,596 B2 | 9/2021 | Hariton |
| 2004/0162638 A1 | 8/2004 | Solomon |

(Continued)

OTHER PUBLICATIONS

A. Oppermann, "What is Nanorobotics?", builtin.com website, dated Mar. 3, 2023, downloaded from https://builtin.com/robotics/nanorobotics (Year: 2023).

(Continued)

*Primary Examiner* — Xin Sheng
(74) *Attorney, Agent, or Firm* — Esplin & Associates, PC

(57) ABSTRACT

Systems and methods for utilizing a device as a marker for virtual content viewed in an augmented reality environment are discussed herein. The device (or sign post) may comprise a wirelessly connectable device linked to a power source and associated with multiple linkage points. The device may provide information to a user (or a device of a user) defining virtual content and a correlation between the linkage points and a reference frame of the virtual content. When rendered by a display device, the virtual content may be presented based on the reference frame of the virtual content correlated to the real world by virtue of the position of the linkage points in the real world.

20 Claims, 5 Drawing Sheets

(56) References Cited

U.S. PATENT DOCUMENTS

| | | | |
|---|---|---|---|
| 2013/0201215 A1* | 8/2013 | Martellaro | G09G 5/00 345/633 |
| 2013/0278635 A1* | 10/2013 | Maggiore | G06F 3/0304 345/633 |
| 2015/0081417 A1 | 3/2015 | Golden | |
| 2017/0092002 A1* | 3/2017 | Mullins | G02B 27/0172 |
| 2018/0350144 A1 | 12/2018 | Rathod | |
| 2023/0364512 A1 | 11/2023 | Hariton | |
| 2023/0368433 A1 | 11/2023 | Hariton | |
| 2024/0009563 A1 | 1/2024 | Hariton | |

OTHER PUBLICATIONS

R. Walters, "Real life Construction quadcopter robots being developed," Extremetech website, dated Dec. 2, 2011, downloaded from https://www.extremetech.com/extreme/107217-real-life-constructicon-quadcopter-robots-being-developed(Year: 2011).

* cited by examiner

SYSTEMS AND METHODS FOR UTILIZING A DEVICE AS A MARKER FOR AUGMENTED REALITY CONTENT

FIELD OF THE INVENTION

The systems and methods described herein relate to presenting virtual content in an augmented reality environment.

BACKGROUND

Augmented reality environments may be used to present virtual content to users as if it were present in the real world.

SUMMARY

The systems and methods described herein may facilitate the presentation of virtual content to a user by utilizing a device as a marker for the virtual content when viewed in an augmented reality environment. An augmented reality environment may include views of images forming virtual content superimposed over views of the real world. The device (or sign post) may comprise a wirelessly connectable device linked to a power source and associated with multiple linkage points. For example, the device may comprise a powered and Bluetooth enabled flash drive, a smartphone, a cellphone, a tablet, or other user device. The device may provide information to a user (or a device of a user) defining virtual content and a correlation between the linkage points and a reference frame of the virtual content. When rendered by a display device, the virtual content may be presented based on the reference frame of the virtual content correlated to the real world by virtue of the position of the linkage points in the real world.

In various implementations, the system described herein may be configured to utilize a device as a marker for virtual content viewed in an augmented reality environment, in accordance with one or more implementations. The system may include one or more of an interface, one or more physical processors, electronic storage, a display device, a sign post, and/or other components. The sign post may be configured to serve as the aforementioned marker for virtual content in an augmented reality environment.

The one or more physical processors may be configured by computer-readable instructions. Executing the computer-readable instructions may cause the one or more physical processors to utilize on-camera sensor information to improve video encoding quality. The computer-readable instructions may include one or more computer program components. The computer program components may include one or more of a communication session component, a user interface component, a content management component, an image generation component, a display control component, and/or other computer program components. The one or more physical processors may be physically located within a user device and/or within any of the other components of the system. For example, the user device may comprise the display device and/or be communicatively coupled to the display device. The one or more physical processors may represent processing functionality of multiple components of the system operating in coordination. Therefore, the various processing functionality described in relation to the one or more processors may be performed by a single component or by multiple components of the system. For example, a user device may perform each of the functions described herein, or the various functions may be divided up such that the functions performed by the communication session component are performed by the user device, the functions performed by the content management component are performed by a sign post, and/or the functions performed by the display control component are performed by the display device.

The communication session component may be configured to facilitate one or more communications sessions between one or more devices. For example, the communication session component may be configured to facilitate one or more communication sessions between one or more devices of a user (e.g., a user device and/or a display device) and a sign post. In various implementations, the one or more communications sessions that are established between the one or more devices of a user and a sign post may enable to one or more devices of a user to provide information to or receive information from the sign post with or without a connection to a network (e.g., the Internet) by providing or receiving the information via the one or more communications sessions.

The user interface component may be configured to obtain an indication of the virtual content accessible to a system. For example, the virtual content accessible to a system may comprise virtual content stored on a user device, on a display device, at a sign post, or otherwise stored in electronic storage, or virtual content available via a network (e.g., obtainable via the Internet, stored in cloud storage, or otherwise available via a network). A list of the available virtual content (i.e., virtual content accessible to the system) may be displayed to the user. For example, a list of the available virtual content may be displayed via a graphical user interface of a user device, a display of display device, or any other display interface provided via a user device and/or other component of the system. In various implementations, the list of available virtual content may be selectable, enabling a user to select virtual content to be presented via the display device.

The content management component may be configured to manage content available to be presented in an augmented reality environment. For example, content management component may be configured to download, upload, modify, remove, and/or otherwise manage information stored and/or accessible by the system. The information may include virtual content information. Virtual content information may define virtual content (or a set of virtual content), a reference frame of the virtual content, and/or a correlation between linkage points associated with a device and the reference frame of the virtual content. In various implementations, the content management component may be configured to obtain virtual content information from a sign post. For example, the content management component may be configured to obtain virtual content information from a sign post in response to an indication (e.g., a selection) of virtual content to be displayed by a display device of a user. In some implementations, the content management component may be configured to download virtual content information from the Internet or from cloud storage. For example, the content management component may be configured to determine whether virtual content information defining selected virtual content is locally stored or available and download the required virtual content information based on a determination that the virtual content information is not locally stored or available.

The image generation component may be configured to generate an image of virtual content to be displayed in an augmented reality environment. In various implementations, the image generation component may be configured to generate an image of virtual content to be displayed in an augmented reality environment based at least on a user's field of view and virtual content information (i.e., information defining at least the virtual content and a reference frame of the virtual content).

A user's field of view may be defined based on orientation information, location information, and/or other information. The orientation information may define an orientation of the display device. For example, the orientation of display device may be defined by one or more of a pitch angle, a roll angle, a yaw angle, and/or other measurements. When looking through the display device, the orientation of display device may indicate the direction of a user's gaze. The location information may identify a physical location of the display device. By determining the direction of a user's gaze and the user's physical position in the real world, a user's field of view may be determined.

The image generation component may be configured to generate an image of virtual content to be displayed in an augmented reality environment based further on the correlation between linkage points associated with the sign post and a reference frame of the virtual content. The linkage points associated with a sign post may serve as an anchor for the reference frame of the virtual content. As such, when rendered in an augmented reality environment by the display device, the virtual content may appear within a user's field of view based on how the reference frame of the virtual content is correlated to the real world by virtue of the position of the linkage points in the real world.

The image generation component may be configured to automatically generate images of the virtual content as a user's field of view changes, thus changing the depiction of the virtual content in the augmented reality environment based on the reference frame of the virtual content and its correlation to the position of the linkage points. The image generation component may be configured to generate an image of virtual content that may appear simultaneously with other images of virtual content. For example, a first set of virtual content based on a first reference frame may be depicted simultaneously with a second set of virtual content based on a second reference frame. In some implementations, the image generation component may be configured to generate images of virtual content automatically when one or more communication sessions have been established or virtual content information has been obtained, and/or in response to an indication from a user to cause virtual content to be displayed.

The display control component may be configured to cause an image generated by image generation component to be displayed in an augmented reality environment via a display device. The display control component may be configured to effectuate transmission of instructions to the display device to cause the image to be displayed. Images of virtual content generated by image generation component may be presented via a display device in conjunction with the real world so that the virtual content appears as if it exists in the real world.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

This disclosure relates to systems and methods for utilizing a device as a marker for virtual content viewed in an augmented reality environment, in accordance with one or more implementations. An augmented reality environment may include views of images forming virtual content superimposed over views of the real world. The device (or sign post) may comprise a wirelessly connectable device linked to a power source and associated with multiple linkage points. For example, the device may comprise a powered and Bluetooth enabled flash drive, a smartphone, a cellphone, a tablet, or other user device. The device may provide information to a user (or a device of a user) defining virtual content and a correlation between the linkage points and a reference frame of the virtual content. When rendered by a display device, the virtual content may be presented based on the reference frame of the virtual content correlated to the real world by virtue of the position of the linkage points in the real world.

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

Exemplary System Architecture

Figure 1:
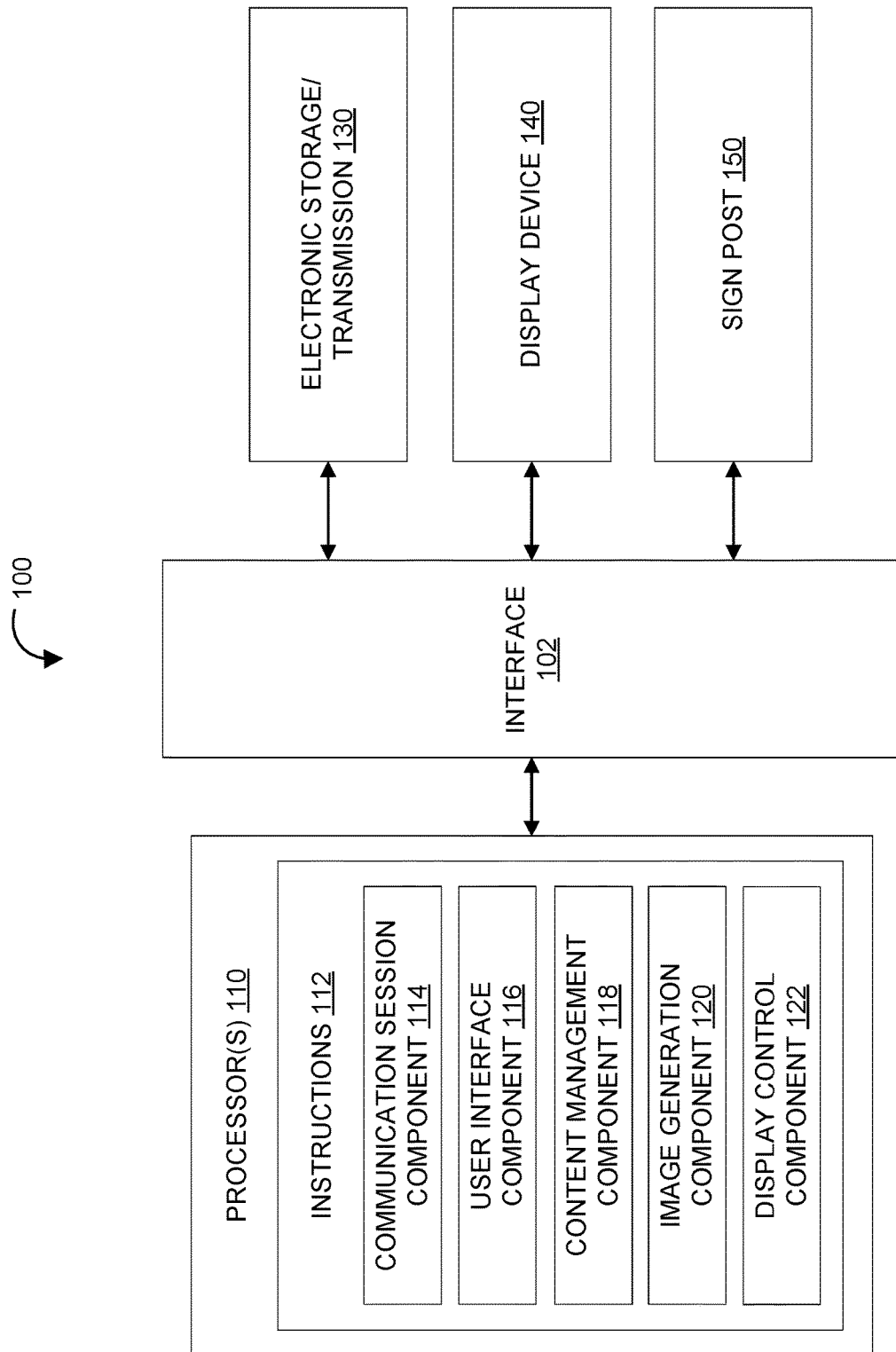
FIG. 1 illustrates a system for utilizing a device as a marker for virtual content viewed in an augmented reality environment, in accordance with one or more implementations.

FIG. 1 illustrates a system 100 for utilizing a device as a marker for virtual content viewed in an augmented reality environment, in accordance with one or more implementations. The system may include one or more of interface 102, one or more physical processors 110, electronic storage 130, display device 140, sign post 150, and/or other components.

The one or more physical processors 110 (also interchangeably referred to herein as processor(s) 110, processor 110, or processors 110 for convenience) may be configured to provide information processing capabilities in system 100. As such, the processor(s) 110 may comprise one or more of a digital processor, an analog processor, a digital circuit designed to process information, a central processing unit, a graphics processing unit, a microcontroller, an analog circuit designed to process information, a state machine, and/or other mechanisms for electronically processing information.

Processor(s) 110 may be configured to execute one or more computer readable instructions 112. Computer readable instructions 112 may include one or more computer program components. Computer readable instructions 112 may include one or more of communication session component 114, user interface component 116, content management component 118, image generation component 120, display control component 122, and/or other computer program components. As used herein, for convenience, the various computer readable instructions 112 will be described as performing an operation, when, in fact, the various instructions program the processor(s) 110 (and therefore system 100) to perform the operation.

Communication session component 114 may be configured to facilitate one or more communications sessions between one or more devices. For example, communication session component 114 may be configured to facilitate one or more communication sessions between one or more devices of a user (e.g., a user device and/or display device 140) and sign post 150. In various implementations, the one or more communications sessions that are established between one or more devices of a user and sign post 150 may enable to one or more devices of a user to provide information to or receive information from sign post 150 with or without a connection to a network (e.g., the Internet) by providing or receiving the information via the one or more communications sessions. For example, communication session component 114 may be configured to facilitate one or more communications sessions by establishing a Bluetooth connection between one or more devices of a user and sign post 150.

In some implementations, communication session component 114 may be configured to facilitate one or more communication sessions between one or more devices of a user and sign post 150 when a user (or one or more devices of a user) moves within a defined proximity of sign post 150. For example, the defined proximity may be defined by a user, defined by an administrator, defined based on the range of a connection between sign post 150 and one or more user devices, and/or otherwise defined. In some implementations, a location of a user may be determined based on location information obtained from one or more devices of a user. For example, location information may be obtained from a GPS component of a user device. In some implementations, communication session component 114 may be configured to facilitate one or more communication sessions between one or more devices of a user and sign post 150 when sign post 150 enters within a field of view of display device 140. For example, an indicator on sign post 150 may trigger communication session component 114 to initiate one or more communication sessions when the indicator is detected within a field of view of display device 140. In some implementations, communication session component 114 may be configured to prompt a user before facilitating one or more communication sessions. For example, communication session component 114 may be configured to cause a message to be provided to a user via a user interface to prompt the user to indicate whether to initiate one or more communication sessions with sign post 150.

User interface component 116 may be configured to generate and cause a user interface to be displayed to a user. In various implementations, the user interface may be displayed to a user via a display interface of a user device. For example, a user interface may be displayed to a user via a graphical user interface of a user device, a display of display device 140, or any other display interface provided via a user device and/or a component of system 100. In some implementations, user interface component 116 may be configured to generate a user interface that provides a user with information related to system 100 without enabling the user to provide input via the user interface. For example, the information related to the system may comprise an indication of one or more connected devices (e.g., a user device such as a smartphone or display device, one or more sign posts, and/or other devices connectable to system 100), sets of virtual content depicted in the augmented reality environment whether currently visible or not, sets of virtual content available to be presented via display device 140 (e.g., content available via one or more devices of a user, electronic storage 130, sign post 150, and/or other components of system 100), an indication of a direction in which virtual content may be visible via a display of a display device, a current time and/or date, and/or other information related to system 100. In some implementations, user interface component 116 may be configured to generate a user interface that provides a user with information related to system 100 and enables a user to provide input. For example, the user interface may comprise selectable icons, input fields, and/or other user input options enabling a user to control one or more aspects of system 100.

In various implementations, user interface component 116 may be configured to generate a user interface that provides an indication of the sets of virtual content available to be presented via display device 140. Virtual content may comprise one or more virtual content items depicted in an augmented reality environment based on one or more reference frames. An augmented reality environment may comprise a space that represents a virtual environment that may be superimposed over a perspective of a physical real world environment around a user. An augmented reality environment may include attributes of a virtual environment, including virtual content superimposed over portions of the physical environment. In some implementations, an augmented reality environment may represent physical objects in the physical world as virtual content in the augmented environment.

A virtual content item may refer to an object, surface, texture, effect, and/or other items visibly manifested in views of the augmented reality environment. A set of virtual content refers to a virtual content item or virtual content items that share a reference frame. That is, the position, orientation, scale, and/or other parameters of the virtual content item or items in the set of virtual content can be manipulated in a coordinated way by manipulating the reference frame for the set of virtual content.

At times, a view of the augmented reality environment may include virtual content items from multiple sets of virtual content. A given set of virtual content may be depicted in the augmented reality environment in accordance with the corresponding reference frames. That means a first set of virtual content present in a view of the augmented reality environment may correspond to a first reference frame that is separate and/or independent from a second reference frame that corresponds to a second set of virtual content. In some implementations, some of the sets of virtual content may have a hierarchical structure in which multiple sets of virtual content are included within a set of virtual content that is "higher" in the hierarchy with a corresponding reference frame. For example, the first set of virtual content and the second set of virtual content may both be included within a third set of virtual content that corresponds to a third reference frame. This hierarchy may enable the position, orientation, scale, and/or other parameters of the first set of virtual content and/or the second set of virtual content to be manipulated separately and/or independently from each (e.g., via the first reference frame and/or the second reference frame), and/or manipulated together by manipulating the third reference frame.

The sets of virtual content available to be presented via display device 140 may include sets of virtual content stored on or accessible via one or more devices of a user, electronic storage 130, sign post 150, and/or other components of system 100. In some implementations, one or more devices of a user may receive an indication of the sets of virtual content available via sign post 150 from sign post 150. In some implementations, user interface component 116 may be configured to generate and cause a user interface to be displayed to a user that includes a selectable list of the sets of virtual content available via sign post 150. In some implementations, user interface component 116 may be configured to receive a selection indicating a set of virtual content to be presented via display device 140.

Content management component 118 may be configured to manage content available to be presented in an augmented reality environment. In various implementations, content management component 118 may be configured to download, upload, modify, remove, and/or otherwise manage information stored and/or accessible by system 100. Information stored and/or accessible by system 100 may include virtual content information. Virtual content information may define virtual content (or a set of virtual content), a reference frame of the virtual content, and/or a correlation between linkage points associated with a device and the reference frame of the virtual content. The linkage points may comprise markers, transponders, stitching points, and/or other identified points on the device. The linkage points associated with a sign post may serve as an anchor for the reference frame of virtual content.

In various implementations, content management component 118 may be configured to obtain virtual content information. For example, content management component 118 may be configured to obtain virtual content information from sign post 150 via one or more communication sessions facilitated by communication session component 114. In some implementations, content management component 118 may be configured to obtain virtual content information from sign post 150 automatically when one or more communication sessions facilitated by communication session component 114 have been established. In some implementations, content management component 118 may be configured to obtain virtual content information from sign post 150 in response to a request for virtual content from a user received at a device of the user. For example, content management component 118 may be configured to obtain virtual content information from sign post 150 in response to receipt of an indication of a selection of virtual content to be displayed on display device 140.

In various implementations, content management component 118 may be configured to obtain virtual content information via a network (e.g., obtainable via the Internet, stored in cloud storage, or otherwise available via a network). For example, content management component 118 may be configured to download virtual content information from the Internet or from cloud storage in response to a selection of virtual content to be displayed on display device 140. In some implementations, content management component 118 may be configured to determine whether virtual content information defining selected virtual content is locally stored or available via a device of a user, electronic storage 130, sign post 150, and/or other components of system 100. Based on a determination that the virtual content information is not available via a device of a user, electronic storage 130, sign post 150, or other component of system 100, content management component 118 may be configured to download virtual content information from the Internet or from cloud storage based. For example, content management component 118 may be configured to automatically download virtual content information based on a determination that the virtual content information is not available via a device of a user, electronic storage 130, sign post 150, or other component of system 100.

In various implementations, content management component 118 may be configured to store virtual content information at one or more devices of a user, electronic storage 130, sign post 150, and/or other storage component accessible by system 100. For example, content management component 118 may be configured to store virtual content information in cloud storage. In some implementations, content management component 118 may be configured to automatically store virtual content information at sign post 150 that is viewed in conjunction with the multiple linkage points associated with sign post 150. In some implementations, content management component 118 may be configured to store virtual content information at sign post 150 based on receipt of an indication from a user to store virtual content information at sign post 150.

In various implementations, content management component 118 may be configured to modify virtual content information. In some implementations, content management component 118 may be configured to modify virtual content information based on input received from a device of a user. For example, a user device, display device 140, and/or other components of system 100 may be configured to receive user input. User input may comprise physical input, audio input, gesture-based input, and/or other input.

Virtual content information stored at sign post 150 may be accessible to other users, enabling virtual content created, modified, and/or obtained by a user to be shared with other users via sign post 150. In various implementations, content management component 118 may be configured to establish one or more access controls associated with virtual content information. For example, content management component 118 may be configured to establish one or more access controls associated with virtual content information stored at sign post 150. Different access controls may be established for different virtual content information. Access controls may restrict users to accessing, downloading, uploading, modifying, storing, removing, and/or otherwise interacting with virtual content information. In various implementations, content management component 118 may be configured to access, download, upload, modify, store, remove, and/or otherwise manage information stored and/or accessible by system 100 based on one or more access controls.

Image generation component 120 may be configured to generate an image of virtual content to be displayed in an augmented reality environment. In various implementations, image generation component 120 may be configured to generate an image of virtual content to be displayed in an augmented reality environment visible via display device 140. Images of virtual content generated by image generation component 120 may be presented via a display of display device 140 in conjunction with the real world so that the virtual content appears as if it exists in the real world. In various implementations, image generation component 120 may be configured to generate an image of virtual content to be displayed in an augmented reality environment based at least on a user's field of view and virtual content information obtained via content management component 118.

In various implementations, image generation component 120 may be configured to generate an image of virtual content to be displayed in an augmented reality environment based on a user's field of view. When utilizing display device 140, a display of the display device may contain a view of the real world based on the user's field of view. A user's field of view may be defined based on orientation information, location information, and/or other information. For example, a user's field of view may be defined based at least on orientation information associated with display device 140 and location information associated with display device 140. Orientation information may define an orientation of display device 140. In some implementations, the orientation of display device 140 may refer to one or more of a pitch angle, a roll angle, a yaw angle, and/or other measurements. Orientation information may be obtained from an orientation sensor of display device 140. When looking through display device 140, the orientation of display device 140 may indicate the direction of a user's gaze. Location information may identify a physical location of display device 140. In some implementations, the physical location of display device 140 may refer to the geographic location of display device 140. Location information may identify a physical location based on GPS coordinates, an address, a relative position with respect to one or more identified locations, and/or other information. Location information may be obtained from a GPS component of a user device, display device 140, and/or other component of system 100. By determining the direction of a user's gaze and the user's physical position in the real world, a user's field of view may be determined.

In various implementations, image generation component 120 may be configured to generate an image of virtual content to be displayed in an augmented reality environment based on virtual content information obtained via content management component 118. Virtual content information may define virtual content (or a set of virtual content), a reference frame of the virtual content, and/or a correlation between linkage points associated with sign post 150 and the reference frame of the virtual content. The linkage points associated with sign posts may serve as an anchor for the reference frame of the virtual content. As such, when rendered in an augmented reality environment by display device 140, the virtual content may appear within a user's field of view based on how the reference frame of the virtual content is correlated to the real world by virtue of the position of the linkage points in the real world.

Figure 2A:
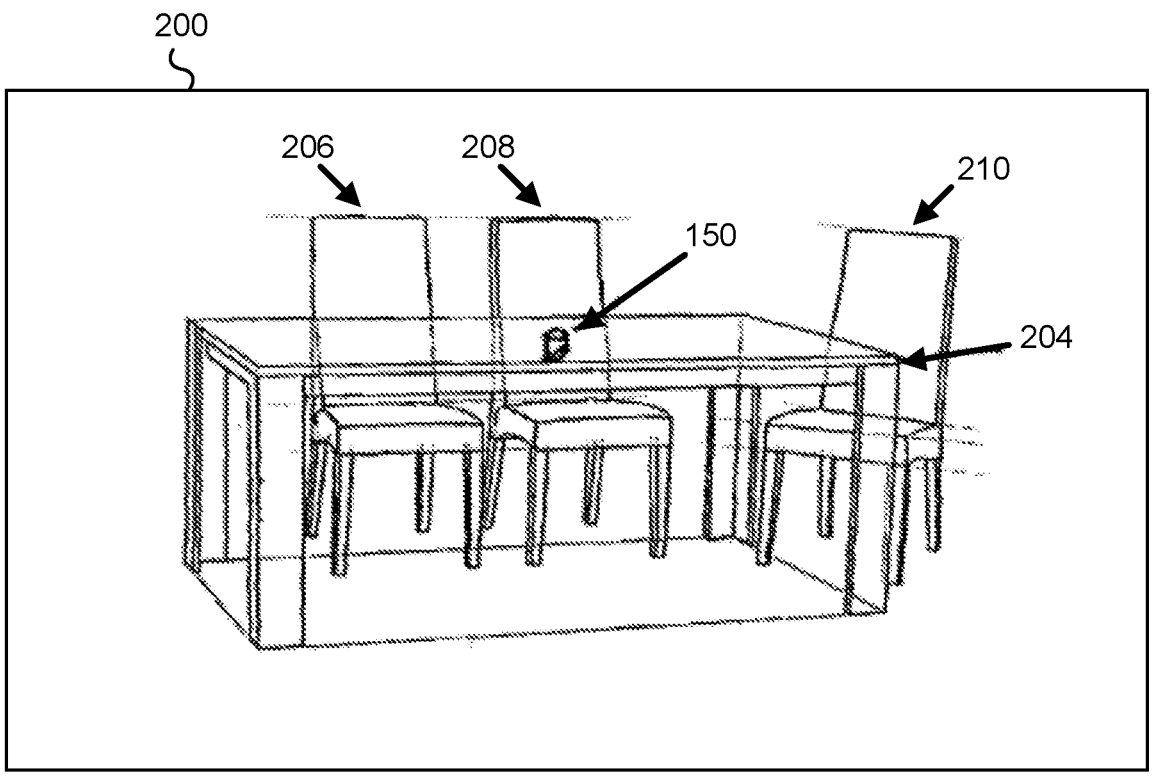
FIG. 2A and FIG. 2B illustrate exemplary displays of an augmented reality environment with and without virtual content, in accordance with one or more implementations.
Figure 2B:
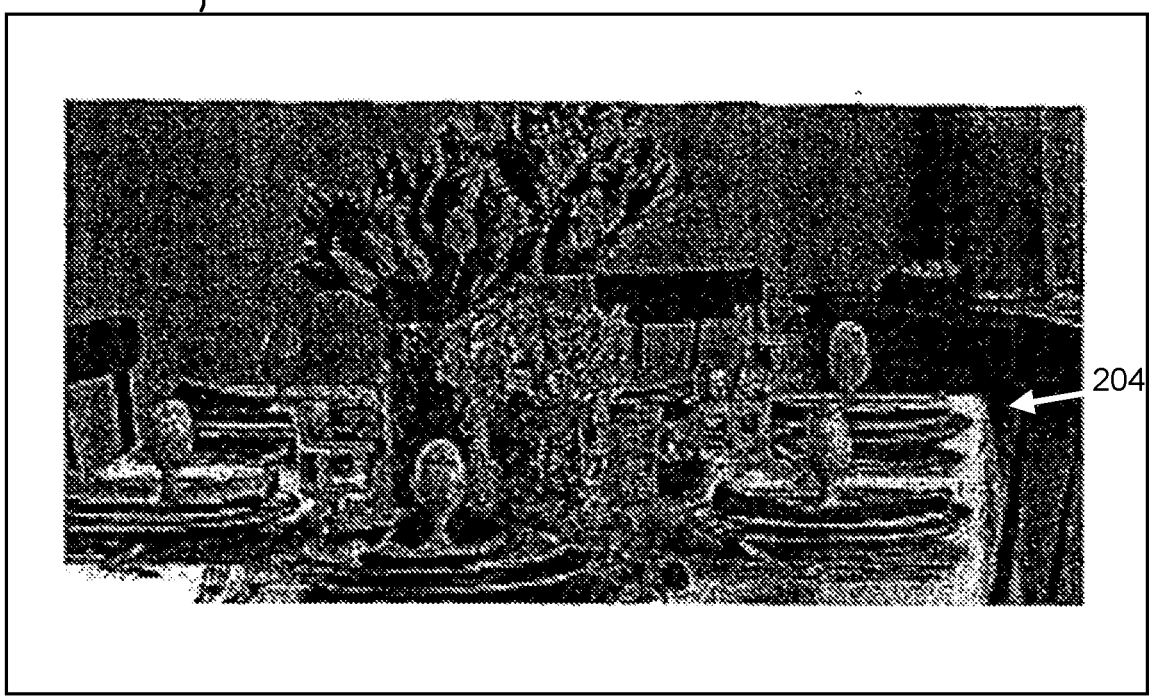

For example, and referring to FIG. 2A, exemplary display 200 of an augmented reality environment without virtual content is illustrated, in accordance with one or more implementations. Exemplary display 200 may include sign post 150, table 204, and chairs 206, 208, and 210. Exemplary display 200 may comprise what is seen when a user looks through display device 140 without virtual content rendered within the user's field of view. If an image is generated by image generation component 120 that is rendered within the user's field of view, virtual content may appear within the display of display device 140. For example, and referring to FIG. 2B, exemplary display 212 of an augmented reality environment with virtual content is illustrated, in accordance with one or more implementations. Exemplary display 212 may include table 204 along with a set of virtual content depicting a table setting (i.e., plates, utensils, center pieces, and other items). In various implementations, virtual content information defining at least the virtual content depicted in exemplary display 212 may be obtained from sign post 150.

In various implementations, image generation component 120 may be configured to generate a new image of virtual content as a user's field of view changes. For example, display device 140 may move as a user utilizing display device 140 changes position and/or rotates display device 140. As display device 140 moves, image generation component 120 may be configured to automatically generate a new image based on the user's current field of view and virtual content information obtained via content management component 118. Therefore, image generation component 120 may be configured to generate a first image of virtual content to be displayed at a first time based on the field of view of the user at the first time and generate a second image of virtual content to be displayed at a second time based on the field of view of the user at the second time.

Figure 3A:
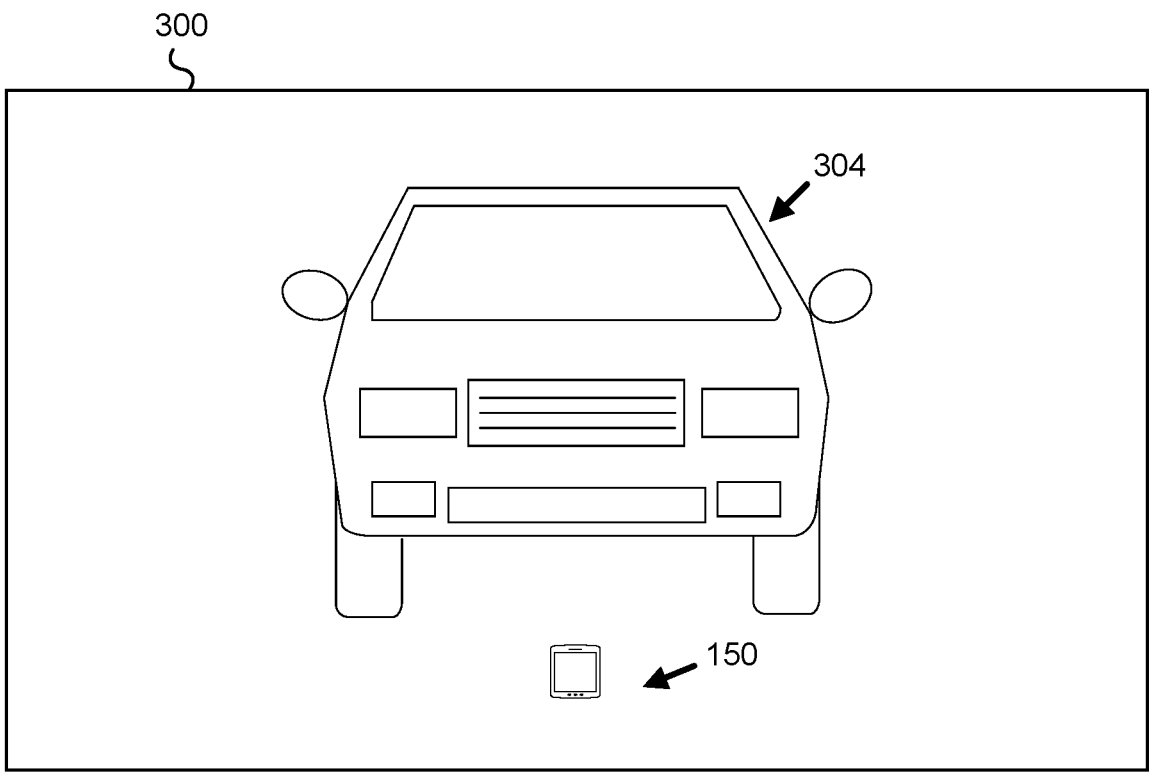
FIG. 3A and FIG. 3B illustrate exemplary displays of an augmented reality environment with virtual content, in accordance with one or more implementations.
Figure 3B:
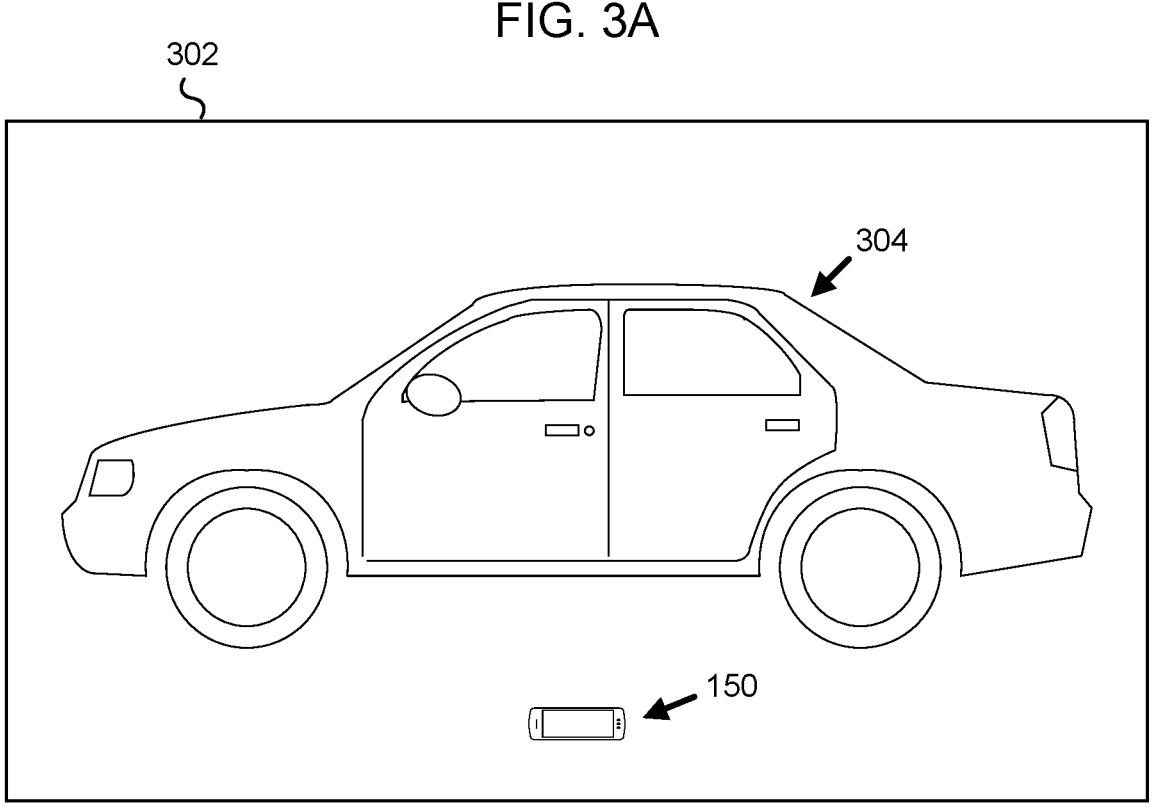

For example, and referring to FIG. 3A, exemplary display 300 of an augmented reality environment with virtual content is illustrated, in accordance with one or more implementations. Exemplary display 300 may comprise sign post 150 and virtual content 304. Exemplary display 300 may include virtual content 304 depicting an automobile. Sign post 150 may comprise a smart phone. Sign post 150 may be associated with multiple linkage points, such as markers, transponders, stitching points, and/or other identified points on the device, that serve as an anchor for the reference frame of virtual content 304. In various implementations, virtual content information defining virtual content 304 and/or a correlation between the linkage points and a reference frame of virtual content 304 may be obtained from sign post 150. As display device 140 moves, image generation component 120 may be configured to automatically generate a new image based on the user's current field of view. For example, and referring to FIG. 3B, exemplary display 302 of an augmented reality environment with virtual content is illustrated, in accordance with one or more implementations. As a user (or display device 140) moves with respect to sign post 150, the images presented to the user via display device 140 may change based on the change in the user's field of view. For example, exemplary display 302 may comprise a display of the augmented reality environment depicted in exemplary display 300 after a user (or display device 140) moves 90 degrees rotationally around sign post 150. As such, exemplary display 302 may comprise an image of virtual content 304 rotated 90 degrees. In various implementations, the reference frame of virtual content 304 may be anchored to the multiple linkage points of sign post 150, enabling virtual content 304 to be fixed in space as a user (or display device 140) moves with respect to sign post 150 and virtual content 304.

In various implementations, image generation component 120 may be configured to generate an image of virtual content to appear simultaneously with another image of virtual content within an augmented reality environment. For example, a first set of virtual content based on a first reference frame may be depicted simultaneously with a second set of virtual content based on a second reference frame. In some implementations, virtual content associated with sign post 150 may be depicted simultaneously with additional virtual content. For example, display device 140 may be displaying virtual content prior to coming within a proximity of sign post 150. In some implementations, image generation component 120 may be configured to generate an image in which a first set of virtual content is overlaid on a second set of virtual content. In some implementations, sets of virtual content from different sources may be depicted by display device 140 simultaneously.

In some implementations, image generation component 120 may be configured to automatically generate an image of virtual content to be displayed in an augmented reality environment when one or more communication sessions facilitated by communication session component 114 have been established and/or when virtual content information has been obtained from content management component 118. In some implementations, image generation component 120 may be configured to generate an image of virtual content to be displayed in an augmented reality environment based on an indication from a user to cause virtual content to be displayed. For example, image generation component 120 may be configured to generate an image of virtual content to be displayed in an augmented reality environment responsive to receipt of a selection of virtual content via user interface component 116.

Display control component 122 may be configured to cause an image of visual content to be displayed in an augmented reality environment via display device 140. In various implementations, display control component 122 may be configured to effectuate transmission of instructions to display device 140. In various implementations, display control component 122 may be configured to generate and/or obtain instructions causing an image of visual content to be displayed via display device 140.

Electronic storage 130 may include electronic storage media that electronically stores information. The electronic storage media of electronic storage 130 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 130 may be a separate component within system 100, or electronic storage 130 may be provided integrally with one or more other components of system 100 (e.g., processor 110 or sign post 150). Although electronic storage 130 is shown in FIG. 1 as a single entity, this is for illustrative purposes only. In some implementations, electronic storage 130 may comprise multiple storage units. These storage units may be physically located within the same device, or electronic storage 130 may represent storage functionality of multiple devices operating in coordination Electronic storage 130 may store software algorithms, information determined by processor 110, information received remotely, and/or other information that enables system 100 to function properly. For example, electronic storage 130 may store virtual content information, an indication of virtual content stored and/or accessible by the system, images generated by image generation component 120, sensor information (e.g., orientation information), device information, location information, and/or other information.

Display device 140 may be configured to present virtual content in an augmented reality environment. In various implementations, display device 140 may be configured to generate light and provide the light to an eye of a user such that the light forms images of the virtual content configured to be perceived in the augmented reality environment as if it were present in the real world. Display device 140 may include one or more of a display, one or more sensors, and/or other components. Presentation of virtual content via a display of display device 140 may be facilitated by control signals communicated to display device 140. For example, display control component 122 may be configured to communicate one or more control signals to display device 140. In some implementations, display device 140 may be configured to present content individually to each eye of a user as stereoscopic pairs.

Display device 140 may comprise any device capable of displaying a real-time view of a physical, real-world environment while superimposing images of virtual content over the real-time view of the physical, real-world environment. As such, display device 140 may comprise any device that includes and/or is communicatively coupled to an image capturing device (e.g., a camera) that may be used to capture a view of the real-world environment. In various implementations, display device 140 may comprise a smartphone, a tablet, a computer, a wearable device (e.g., a headset, a visor, and/or any other wearable device) and/or any other device configured to present views of virtual content in an augmented reality environment. In some implementations, display device 140 may be arranged on, and/or may comprise part of, a headset (not shown in FIG. 1). When headset is installed on a user's head, the user's gaze may be directed towards display device 140 (or at least a display of display device 140) to view content presented by display device 140.

A display of display device 140 may include one or more of screen, a set of screens, a touchscreen, a monitor, a headset (e.g., a head-mounted display, glasses, goggles), and/or other displays. In some implementations, a display may include one or more of a transparent, semi-transparent, reflective, and/or semi-reflective display component, such as a visor. Images of virtual content may be presented on the display component such that the user may view the images presented on the display component as well as the real-world through the display component. The virtual content may be perceived as being present in the real world. Such a configuration may provide an interactive space comprising an augmented reality environment. By way of non-limiting illustration, display device 140 may comprise an AR headset.

Individual sensors of display device 140 may be configured to generate output signals. An individual sensor may include an orientation sensor and/or other sensors. An orientation sensor of display device 140 may be configured to generate output signals conveying orientation information and/or other information. Orientation information derived from output signals of an orientation sensor may define an orientation of display device 140. In some implementations, orientation of display device 140 may refer to one or more of a pitch angle, a roll angle, a yaw angle, and/or other measurements. An orientation sensor may include an inertial measurement unit (IMU) such as one or more of an accelerometer, a gyroscope, a magnetometer, Inclinometers, and/or other devices. In various implementations, the orientation of display device 140 may be communicated to image generation component 120 to generate and/or update images of virtual content to be viewed via display device 140.

Figure 4A:
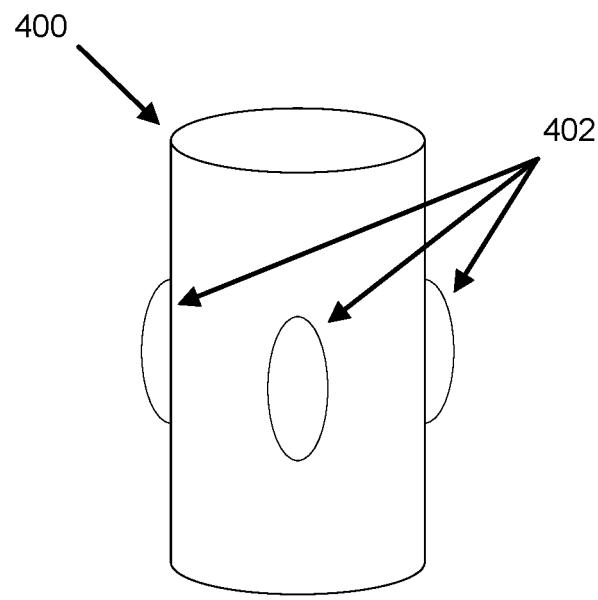
FIG. 4A and FIG. 4B illustrate an exemplary sign post with multiple linkage points, in accordance with one or more implementations.
Figure 4B:
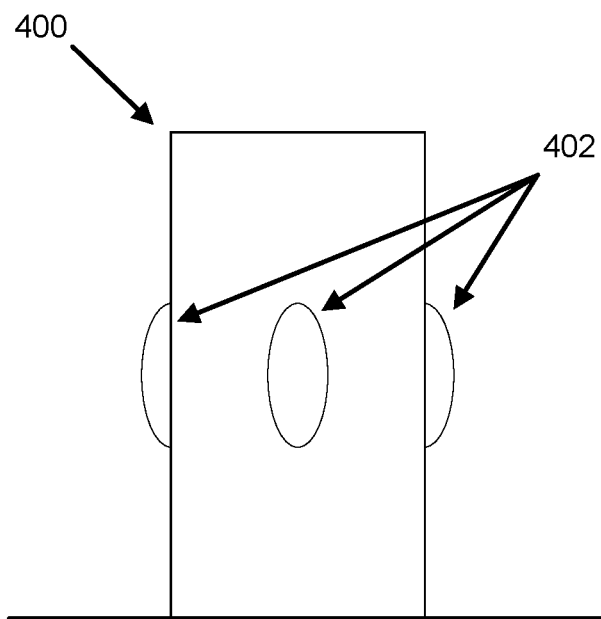

Sign post 150 may comprise a wirelessly connectable device linked to a power source and associated with multiple linkage points. For example, the device may comprise a powered and Bluetooth enabled flash drive, a smartphone, a cellphone, a tablet, or other user device. The multiple linkage points may comprise markers, transponders, stitching points, and/or other identified points on the device. For example, and referring to FIG. 4A and FIG. 4B, sign post 150 may comprise a device 400 and multiple linkage points 402. In various implementations, multiple linkage points 402 may be defined based on a sign post application installed on sign post 150. Sign post 150 may be configured to interact with multiple users (or multiple users devices) simultaneously. Sign post 150 may be configured to provide information to a user (or a device of a user) defining virtual content and a correlation between the linkage points and a reference frame of the virtual content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 110, electronic storage 130, display device 140, and sign post 150 are shown to be connected to interface 102 in FIG. 1, any communication medium may be used to facilitate interaction between any components of system 100. One or more components of system 100 may communicate with each other through hard-wired communication, wireless communication, or both. For example, one or more components of system 100 may communicate with each other through a network. For example, processor 110 may wirelessly communicate with electronic storage 130. By way of non-limiting example, wireless communication may include one or more of the Internet, radio communication, Bluetooth communication, Bluetooth Low Energy (BLE) communication, Wi-Fi communication, cellular communication, infrared communication, or other wireless communication. Other types of communications are contemplated by the present disclosure.

Although processor 110 is illustrated in FIG. 1 as a single component, this is for illustrative purposes only. In some implementations, processor 110 may comprise multiple processing units. These processing units may be physically located within the same device, or processor 110 may represent processing functionality of multiple devices operating in coordination. For example, processor 110 may be located within a user device, display device 140, sign post 150, and/or other components of system 100. In some implementations, processor 110 may be remote from a user device, display device 140, sign post 150, and/or other components of system 100. Processor 110 may be configured to execute one or more components by software; hardware; firmware; some combination of software, hardware, and/or firmware; and/or other mechanisms for configuring processing capabilities on processor 110.

Furthermore, it should be appreciated that although the various instructions are illustrated in FIG. 1 as being co-located within a single processing unit, in implementations in processor(s) 110 include multiple processing units, one or more instructions may be executed remotely from the other instructions.

The description of the functionality provided by the different computer-readable instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 110 may be programmed by one or more additional instructions that may perform some or all of the functionality attributed herein to one of the computer-readable instructions.

Exemplary Flowchart of Process

Figure 5:
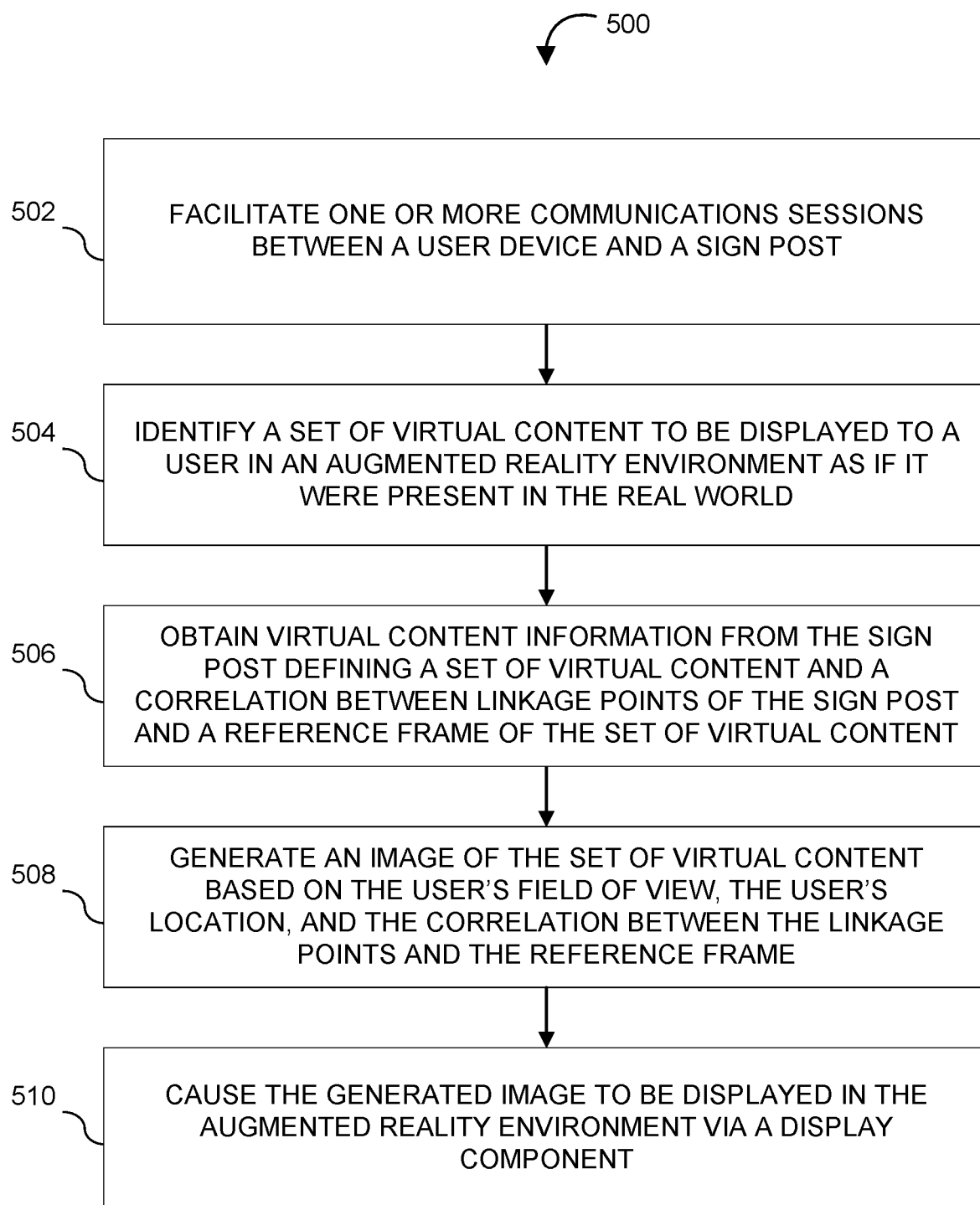
FIG. 5 illustrates a method for utilizing a device as a marker for virtual content viewed in an augmented reality environment, in accordance with one or more implementations.

FIG. 5 illustrates a method 500 for utilizing a device as a marker for virtual content viewed in an augmented reality environment, in accordance with one or more implementations. The operations of method 500 presented below are intended to be illustrative and, as such, should not be viewed as limiting. In some implementations, method 500 may be accomplished with one or more additional operations not described, and/or without one or more of the operations discussed. In some implementations, two or more of the operations may occur substantially simultaneously. The described operations may be accomplished using some or all of the system components described in detail above.

In some implementations, method 500 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 500 in response to instructions stored electronically on one or more electronic storage mediums. The one or more processing devices may include one or more devices configured through hardware, firmware, and/or software to be specifically designed for execution of one or more of the operations of method 500.

In an operation 502, method 500 may include facilitating one or more communication sessions between a user device and a sign post. In various implementations, the one or more communications sessions that are established between at least one user device and a sign post may enable the user device to provide information to or receive information from the sign post with or without a connection to a network (e.g., the Internet) by providing or receiving the information via the one or more communications sessions. In some implementations, operation 502 may be performed by a processor component the same as or similar to communication session component 114 (shown in FIG. 1 and described herein).

In an operation 504, method 500 may include identifying a set of virtual content to be displayed to a user in an augmented reality environment as if it were present in the real world. In various implementations, a user may be provided with a user interface displaying a list of virtual content available to be presented via a display device. In some implementations, the user interface may comprise selectable icons, input fields, and/or other user input options enabling a user to select virtual content, or a set of virtual content, to be displayed via the display device. The set of virtual content to be displayed in the augmented reality environment as if it were present in the real world may be identified based on the selection. In some implementations, operation 504 may be performed by a processor component the same as or similar to user interface component 116 (shown in FIG. 1 and described herein).

In an operation 506, method 500 may include obtaining virtual content information from the sign post. The virtual content information may define a set of virtual content and a correlation between linkage points associated with the sign post and a reference frame of the virtual content. The virtual content information may be automatically obtained when one or more communication sessions have been established or in response to a request for virtual content from a user received at a device of the user. In some implementations, operation 506 may be performed by a processor component the same as or similar to content management component 118 (shown in FIG. 1 and described herein).

In an operation 508, method 500 may include generating an image of the set of virtual content based on the field of view of the user and the correlation between the linkage points associated with the device and the reference frame of the virtual content. A user's field of view may be defined based on orientation information, location information, and/or other information. The linkage points associated with a sign post may serve as an anchor for the reference frame of the virtual content. As such, when rendered in an augmented reality environment by the display device, the virtual content may appear within a user's field of view based on how the reference frame of the virtual content is correlated to the real world by virtue of the position of the linkage points in the real world. In some implementations, operation 508 may be performed by a processor component the same as or similar to image generation component 120 (shown in FIG. 1 and described herein).

In an operation 510, method 500 may include causing the generated image to be displayed in the augmented reality environment via a display component. In various implementations, the generated image is caused to be displayed in the augmented reality environment via the display component by transmitting instructions to the display component. In some implementations, operation 510 may be performed by a processor component the same as or similar to display control component 122 (shown in FIG. 1 and described herein).

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to utilize a marker device as a marker for virtual content viewed in an augmented reality environment, wherein the marker device includes electronic storage that stores virtual content information, the system comprising:
a presentation device configured to form images of the virtual content configured to be perceived in the augmented reality environment by a user as if it were present in a real world; and
one or more physical computer processors configured by computer readable instructions to:
determine whether the marker device is within a field of view of the presentation device associated with the user;
facilitate, with or without a network connection, a wireless communication session between a device of the user and the marker device responsive to determination that the marker device is within the field of view, wherein the marker device stores a set of virtual content available for presentation, wherein some of the set of virtual content is defined by virtual content information stored on the marker device and some of the set of virtual content is defined by other virtual content information downloaded by the marker device from the Internet or cloud storage, wherein the set of virtual content is defined by a combination of the virtual content information and the other virtual content information, wherein the wireless communication session is facilitated responsive to a location of the user being within a defined proximity of the marker device, wherein the location of the user is determined based on location information obtained from a Global Positioning System component of the device of the user, an address, and a relative position of the device with respect to one or more other identified locations;
obtain the virtual content information from the marker device during the wireless communication session with the marker device, the virtual content information defining a visual representation of the set of virtual content;
cause the other virtual content information to be downloaded by the marker device from the Internet or the cloud storage;
generate an image of the set of virtual content in accordance with the visual representation defined by the combination of the virtual content information and the other virtual content information to be presented in the augmented reality environment by combining the virtual content information obtained from the marker device during the wireless communication session and the other virtual content information downloaded by the marker device from the Internet or the cloud storage, wherein the image of the set of virtual content is generated based on the field of view of the user, wherein the field of view of the user is defined based on location information and orientation information for the presentation device, the location information indicating the same location as the device of the user, and the orientation information indicating at least a pitch angle, a roll angle, and a yaw angle associated with the presentation device; and cause the generated image to be presented in the augmented reality environment via the presentation device.

2. The system of claim 1, wherein the one or more physical computer processors are further configured to:

receive an indication of multiple sets of virtual content stored on the marker device, wherein individual ones of the sets of virtual content comprises one or more virtual content items and the sets of virtual content include at least the set of virtual content;

cause a selectable list of the sets of virtual content to be presented to the user; and receive a selection indicating the set of virtual content, wherein the image of the set of virtual content is generated based on the selection.

3. The system of claim 1, wherein the one or more physical computer processors are further configured to:

receive an indication of a selection of the set of virtual content, wherein causing the other virtual content information defining some of the set of virtual content to be downloaded by the marker device is based on the selection.

4. The system of claim 3, wherein the one or more physical computer processors are further configured to:

determine that the other virtual content information defining the selected set of virtual content is not locally stored by the marker device, wherein the other virtual content information is caused to be downloaded by the marker device based on the determination that the other virtual content information is not locally stored by the marker device.

5. The system of claim 1, wherein facilitating the wireless communication session between the device of the user and the marker device with or without the network connection includes via the Internet connections and Bluetooth connections.

6. The system of claim 1, wherein the one or more processors are further configured to modify the virtual content information and/or the other virtual content information to reflect modifications to the set of virtual content input by user interaction with the set of virtual content through the presentation device, wherein the user interaction includes user interaction by the user and/or one or more other users.

7. The system of claim 6, wherein the one or more processors are further configured to communicate the modifications to the set of virtual content to the marker device via the wireless communication session.

8. The system of claim 6, wherein the one or more processors are further configured to:

generate one or more updated images of the set of virtual content in accordance with the modifications to the set of virtual content, wherein the one or more updated images of the set of virtual content are generated based on one or more fields of view of the one or more users, wherein individual ones of the fields of view of the one or more users are defined based on the location information and the orientation information for one or more presentation devices of the one or more users, wherein the one or more generated updated images are different; and cause the one or more generated updated images to be presented in the augmented reality environment via the one or more presentation devices associated with the one or more other users.

9. The system of claim 8, wherein the one or more users includes a second user that is associated with a second presentation device, wherein the one or more generated updated images includes a second updated image, wherein the second updated image is based on the modifications input by the second user and the field of view of the second user, wherein the fields of view include the field of view of the second user, wherein the one or more processors are further configured to cause the second updated image to be presented in the augmented reality environment via the second presentation device.

10. The system of claim 8, wherein the one or more processors are further configured to cause the one or more generated updated images to be presented in the augmented reality environment via the one or more presentation devices associated with the one or more other users contemporaneously and in real-time.

11. The system of claim 1, wherein a second presentation device is associated with a second user, wherein the one or more processors are further configured to:

generate a second image of the set of virtual content in accordance with the visual representation defined by the virtual content information to be presented in the augmented reality environment by combining the virtual content information obtained from the marker device during the wireless communication session and the other virtual content information downloaded from the Internet or the cloud storage, wherein the image of the set of virtual content is generated based on a field of view of the second user that is defined based on second location information for the second presentation device and second orientation information for the second presentation device, the second location information indicating the same location as the device of the second user, and the second orientation information indicating at least a pitch angle, a roll angle, and a yaw angle associated with the second presentation device, wherein the field of view of the user and the field of view of the second user are different; and cause the generated second image to be presented in the augmented reality environment via the second presentation device contemporaneously with the generated image to be presented in the augmented reality environment via the presentation device.

12. A marker device configured to facilitate presentation of virtual content in an augmented reality environment via a presentation device under the control of one or more presentation device processors, the presentation device being configured to form images of the virtual content configured to be perceived in the augmented reality environment as if it were present in the real world, the marker device comprising:

electronic storage that stores a set of virtual content available for presentation, wherein some of the set of virtual content is defined by virtual content information, the virtual content information defining visual representation of the set of virtual content such that generation of images of the set of virtual content is based on the virtual content information and other virtual content information downloaded from the Internet or cloud storage; and a wireless transponder configured to wirelessly communicate, via a wireless communication session between a device of a user and the marker device responsive to determination that the marker device is within a field of view of the presentation device, the virtual content information to the one or more presentation device processors to facilitate generation of an image of the set of virtual content by the presentation device in the augmented reality environment in accordance with the virtual content information, wherein the wireless communication session is facilitated responsive to a location of the user being within a defined proximity of the marker device, wherein the location of the user is determined based on location information from a Global Positioning System component of the device of the user, an address, and a relative position of the device with respect to one or more other identified locations.

13. The marker device of claim 12, wherein the electronic storage stores virtual content information corresponding to multiple different sets of virtual content, wherein the marker device is further configured to wirelessly transmit a list of at least some of the different sets of virtual content to the presentation device for presentation to facilitate user selection of one of the different sets of virtual content, and wherein the set of virtual content is included in the different sets of virtual content.

14. The marker device of claim 13, wherein wireless transmission of the virtual content information for the set of virtual content is responsive to user selection of the set of virtual content on the presentation device.

15. The marker device of claim 12, further configured to receive, via wireless communication with the presentation device, changes to the virtual content information associated with changes made to the set of virtual content by the user through interaction with the set of virtual content on the presentation device, and to store the changes in the electronic storage.

16. The marker device of claim 15, further configured to wirelessly transmit, via the wireless transponder to one or more presentation device processors associated with a second presentation device, the virtual content associated with the set of virtual content with reflecting the changes to the set of virtual content by the user and/or other users, such wireless transmission facilitating generation of an image of the set of virtual content on the second presentation device with the changes such that the image of the set of virtual content is viewable via the second presentation device in real-time.

17. The marker device of claim 15, wherein the electronic storage further stores access controls for individual ones of the different sets of virtual content, wherein the access controls for the set of virtual content indicate whether or not the changes made to the set of virtual content by the user are stored to the electronic storage.

18. The marker device of claim 17, wherein storage of the changes made to the set of virtual content by the user through interaction with the set of virtual content on the presentation device is responsive to the access controls for the set of virtual content indicating such changes are stored to the electronic storage.

19. The marker device of claim 12, wherein the electronic storage further stores access controls for the set of virtual content, the access controls for the set of virtual content indicating whether the user associated with the presentation device should be able to access the set of virtual content.

20. The marker device of claim 19, further configured such that wireless transmission of the virtual content information to the one or more presentation device processors to facilitate generation of the image of the set of virtual content by the presentation device in the augmented reality environment in accordance with the virtual content information is responsive to the access controls for the set of virtual content indicating the user associated with the presentation device should be able to access the set of virtual content.

\* \* \* \* \*